Nov. 17, 1959
E. O. WANGERIN ET AL
2,912,899
MAGAZINE INTERLOCK MECHANISM
Filed April 25, 1958
3 Sheets-Sheet 1
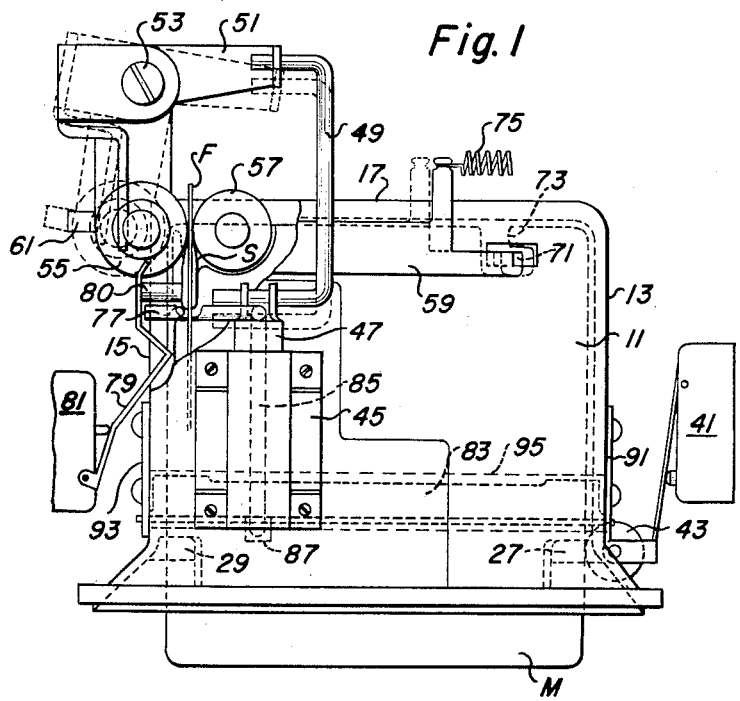
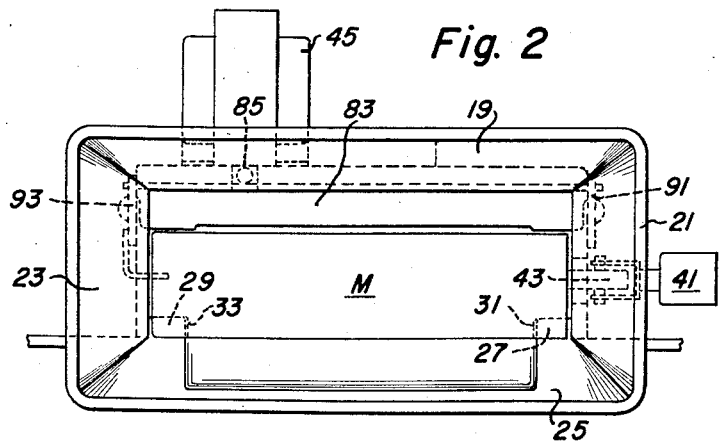
ELMER O. WANGERIN
EDWARD B. SCHOONMAKER
INVENTORS
BY R. Frank Smith
Paul P. Holmes
ATTORNEYS Nov. 17, 1959 E. O. WANGERIN ET AL 2,912,899
MAGAZINE INTERLOCK MECHANISM
Filed April 25, 1958 3 Sheets-Sheet 2

ELMER O. WANGERIN
EDWARD B. SCHOONMAKER
INVENTORS
BY R. Frank Smith
Paul R. Holmes
ATTORNEYS Nov. 17, 1959  E. O. WANGERIN ET AL  2,912,899
MAGAZINE INTERLOCK MECHANISM
Filed April 25, 1958  3 Sheets-Sheet 3
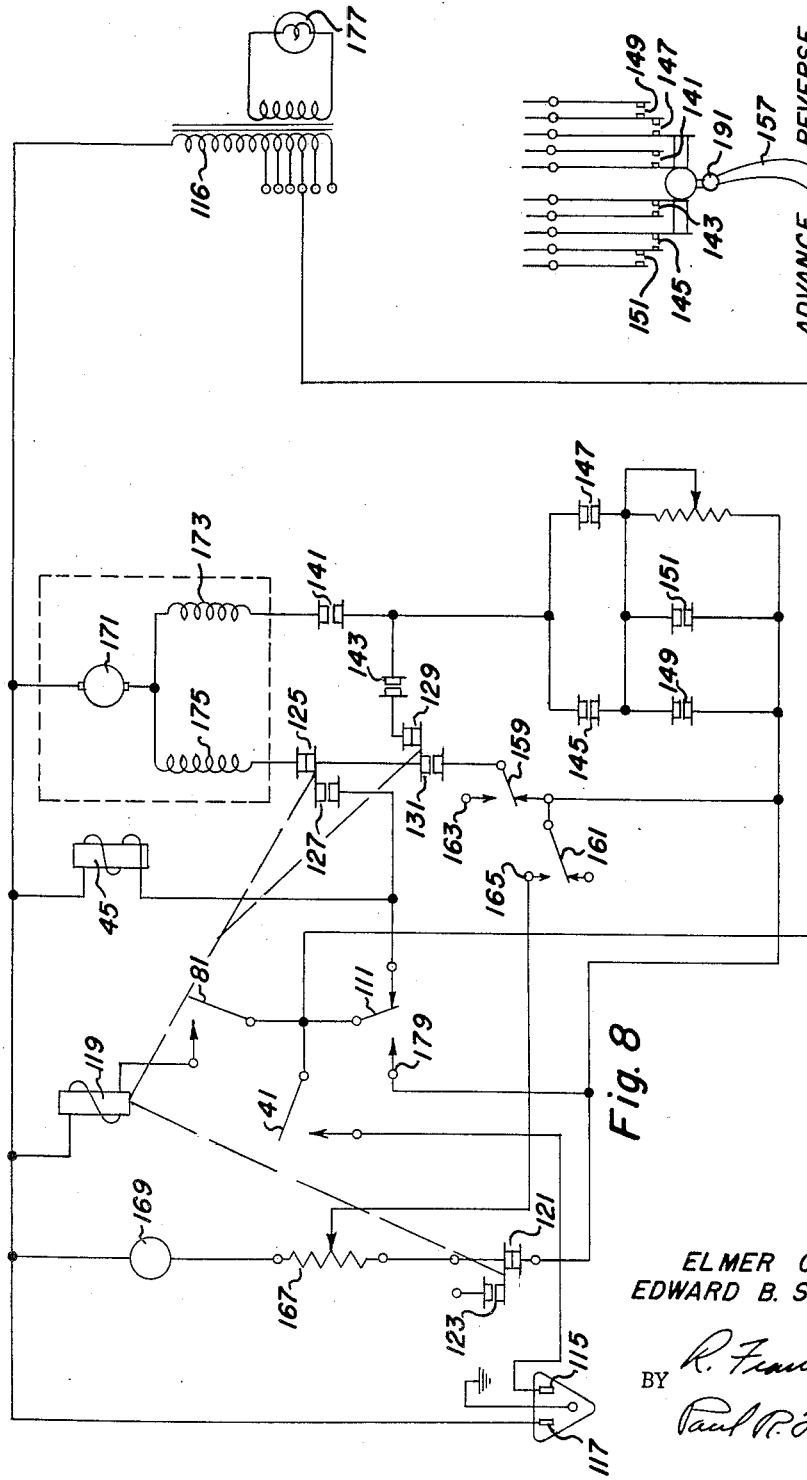
ELMER O. WANGERIN
EDWARD B. SCHOONMAKER
INVENTORS
BY R. Frank Smith
Paul R. Holmes
ATTORNEYS

United States Patent Office 2,912,899
Patented Nov. 17, 1959

2,912,899
MAGAZINE INTERLOCK MECHANISM

Elmer O. Wangerin and Edward B. Schoonmaker, Rochester, N.Y., assignors to Eastman Kodak Company, Rochester, N.Y., a corporation of New Jersey Application April 25, 1958, Serial No. 730,945

8 Claims. (Cl. 88—17)

This invention relates to a magazine interlock mechanism for use in a photographic apparatus and more particularly to a mechanism which insures proper placement of a magazine in the magazine-receiving cavity of the apparatus and also prevents the removal of the magazine therefrom except when the film strip in the apparatus is fully returned into the magazine.

The magazine interlock mechanism of the present invention was designed primarily for use with a microfilm reader adapted to receive a magazine containing a film strip on which the microfilm images are carried. It should be noted, however, that the magazine interlock mechanism of the present invention could be advantageously utilized in other apparatus such as, for example, cameras and film strip projectors. The magazine utilized in conjunction with the hereinafter described magazine interlock mechanism is a substantially square box containing a single core on which the film strip is attached and wound. An aperture in the bottom face of the magazine permits the core to be engaged and rotated by the means incorporated in the reader. The microfilm reader also includes means for engaging and withdrawing the film strip from the magazine. With a film reader of this type it is necessary and desirable to provide a system of interlocks which firstly, prevents the improper placing of the magazine in the magazine-receiving cavity; secondly, prevents the film strip in the magazine from being withdrawn from the magazine unless the magazine is properly positioned within the magazine-receiving cavity; and thirdly, prevents the removal of the magazine from the magazine-receiving cavity when any of the payed-out film strip remains in the film reader and has not been returned into the magazine. The magazine interlock mechanism of the present invention comprises broadly a series of microswitches which are actuated during the insertion of the magazine into the magazine-receiving cavity to align a locking detent with respect to the magazine and also to move a locking bar into position over the magazine to prevent removal of the magazine.

The primary object of the present invention is therefore to provide a magazine interlock mechanism which is actuated upon insertion of the magazine into a magazine-receiving cavity to prevent withdrawal of the film strip from the magazine unless the magazine has been properly positioned and locked in the cavity.

Another object of the present invention is to provide a magazine interlock mechanism which is operative upon advance of any amount of film strip from the magazine to securely lock the magazine within the magazine-receiving cavity and thereby prevent the removal of the magazine unless all of the film strip has been returned into the magazine.

Still other objects and advantages of the present invention will become readily apparent to those skilled in the art from the following description with reference to the drawings in which like characters denote like parts and wherein:

Fig. 1 and Fig. 2 are a plan view and front elevation view, respectively, of the magazine interlock mechanism showing the relationship between the magazine, the interlocking members and the magazine-receiving cavity.

Figs. 4, 5, 6, and 7 are detail views of the magazine interlock mechanism illustrated in the preceding figures.

Fig. 8 is a schematic wiring diagram illustrating the electrical circuit utilized to operate the magazine interlock mechanism of the present invention and;

Fig. 9 is a schematic illustration of the switch provided in the microfilm reader and utilized to actuate the electrical circuits illustrated in Fig. 8.

Figure 4:
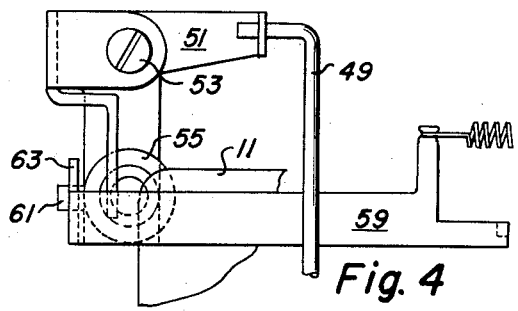
Figure 7:
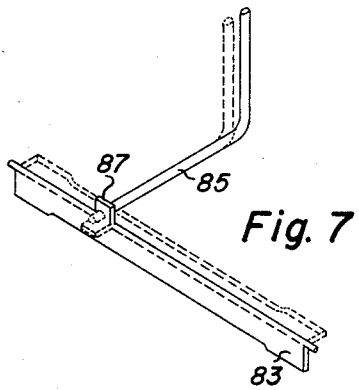
Figure 5:
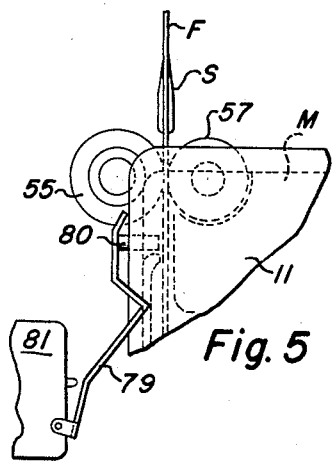
Figure 6:
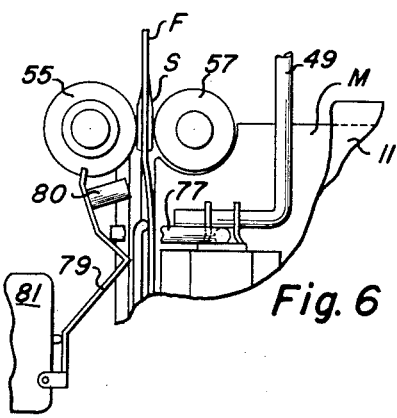

In Fig. 1, the magazine-receiving cavity is illustrated as comprising a top wall 11, side walls 13 and 15 and end wall 17. The cavity also comprises a bottom wall 18 shown in Figs. 2 and 3. The front portions of the side and bottom walls are flared as indicated at 19, 21, 23 and 25, in order to facilitate the insertion of the magazine which is designated by the character M. Two upstanding detents 27 and 29 are provided on the bottom wall 18 of the cavity. When the magazine M is properly positioned within the cavity, the detents 27 and 29 engage small notches 31 and 33 respectively, provided in the bottom face of the magazine. A microswitch 41 is mounted adjacent side wall 13 of the magazine cavity with a roller 43 protruding into the cavity for engagement by magazine M during insertion into the cavity. The engagement of the magazine with the roller 43 actuates microswitch 41 which in turn energizes solenoid 45. With the energizing of solenoid 45, plunger 47 is moved toward the front of the magazine cavity, that is downwardly as viewed in Fig. 1, and carries the arm 49 and bellcrank 51 from the position indicated by the solid line in Fig. 1 to the position indicated by the dotted lines. Bellcrank 51 is pivotally mounted at 53 to the frame of the reader, not shown. The pivotal movement of bellcrank 51 spaces the contact roller 55 a short distance from the film drive roller 57. As best shown in Figs. 1, 5 and 6, the leading end of the film strip F protrudes slightly from the magazine M even when the film strip has been rewound on the magazine core (not shown) back into the magazine. In order to prevent the leading end of the film strip F from also returning completely into the magazine a plastic stop S slightly longer than the opening in the magazine through which the film strip passes, is formed on the leading end of the film strip F. The spacing movement of roller 55 from roller 57 permits the leading end of film strip F to slide freely therebetween. The pivotal movement of the bellcrank 51 is also transmitted to the detent lever 59, as a result of the connection between the tab 61 on lever 51 and extension 63 on lever 59. Movement of the lever 59 aligns the detent 71 with the entrance slot 73 provided in the end of magazine M and permits the magazine M to be completely inserted into the cavity. The spring 75 operates to return lever 59 to its original position and thereby lock the magazine within the cavity after solenoid 45 has been deenergized, as will be hereinafter more fully explained. The energizing of solenoid 45 also causes arm 77 to engage the switch lever 79 of microswitch 81, as best illustrated in Fig. 6, and closes the electrical circuit controlled by the normally open microswitch 81. Lever 79 carries a shoe 80 adjacent the end thereof which when engaged by stop S also causes microswitch 81 to be closed. Microswitch 81 is shown in the normal open position in Fig. 5. The reason for actuating microswitch 81 and the circuits controlled thereby will be hereinafter described with reference to the wiring diagram of Fig. 8.

Figure 3:
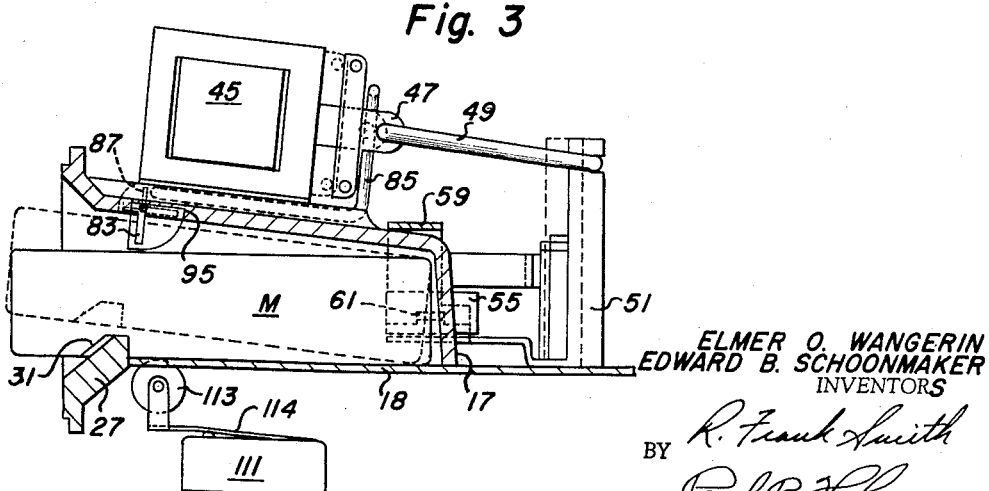
Fig. 3 is a side elevation view partly in section of the magazine interlock mechanism shown in Figs. 1 and 2.

The energizing of solenoid 45 also controls the movement of locking bar 83 through the arm 85 which engages a tab 87 on locking bar 83. The locking bar 83 is pivotally mounted on supports 91 and 93 carried by the side walls 13 and 15 of the magazine cavity. A suitable slot 95 is provided in the top wall 11 to receive the locking bar 83 and tab 87 as is best illustrated in Figs. 1 and 3 of the drawings. The solid outline of locking bar 83 shown in Fig. 3 represents the position taken by the locking bar prior to the energizing of solenoid 45 and the dotted outline of locking bar 83 indicates the position taken by the locking bar after solenoid 45 has been energized. Thus when solenoid 45 is energized, as a result of the initial movement of magazine M into the cavity and actuation of microswitch 41, the locking bar 83 is pivoted out of the way and permits magazine M to enter further into the cavity. Still another microswitch 111 is mounted with a roller 113 carried on lever 114 extending through the bottom wall 18 of the magazine cavity. When the magazine is fully positioned within the cavity and lowered over detents 27 and 29, roller 113 is depressed and the electrical circuit controlled by microswitch 111 is closed. Again the purpose of an electrical circuit controlled by microswitch 111 will be hereinafter fully explained with respect to Fig. 8.

As indicated in Fig. 8, the normal open microswitch 41 is connected in series with the input lead 115, transformer 116 and the other input lead 117. Solenoid 45 is connected across the input lead 117 through the normal closed contacts of microswitch 111 and through microswitch 41 when in the closed position to input lead 115. Thus when microswitch 41 is actuated to close the circuit, solenoid 45 is energized resulting in contact roller 55 being pivoted away from the drive roller 57, detent lever 59 being moved over to align detent 71 with the notch 73 provided in the magazine M, locking bar 83 being pivoted to the dotted position indicated in Fig. 3 and microswitch 81 being actuated by the movement of arm 77 against lever 79. Actuation of microswitch 81 closes the circuit from input lead 117 through the film tab relay 119, the now closed contacts of microswitch 41 to input lead 115. The film tab relay 119 controls the circuits through contacts indicated at 121, 123, 125, 127, 129 and 131. Contacts 121, 125 and 129 are indicated in their normally closed positions in Fig. 8. When film tab relay 119 is energized, the circuit through contacts 121 is opened and through contacts 123 is closed, the circuit through contacts 125 is opened and through contacts 127 is closed, and the circuit through contacts 129 is opened and through contacts 131 is closed.

The contacts indicated at 141, 143, 145, 147, 149 and 151, are controlled by the manual switch 157 schematically illustrated in Fig. 9. Switch 157 also controls the actuation of the switches indicated at 159 and 161 through a suitable cam arrangement (not shown). Switches 159 and 161 remain in the normal positions shown in Fig. 8 when the handle of manual switch 157 is in the neutral position indicated in Fig. 9, but switch 159 moves to contact 163 when the handle of switch 157 is in the advance position, switch 161 remaining in its normal open position, and switch 161 is moved to contact 165 when the handle of switch 157 is moved to the reverse position as indicated by the arrow in Fig. 9 with switch 159 remaining in its normal closed position. The numeral 167 indicates a variable resistor which is connected in series with a tendency drive motor 169 which is mounted under the magazine-receiving cavity. Coupling means (not shown) on motor 169 engages the core of magazine M when fully positioned in the cavity to apply a torque to the core. The numeral 171 indicates the film drive motor having an advance field coil 173 and a reverse field coil 175. Motor 171 drives film drive roller 57 to draw film strip F from or return strip F into the magazine M depending upon the direction of rotation of the motor. A signal lamp 177 is connected across the secondary of transformer 115 and is lighted upon insertion of the magazine M into the magazine-receiving cavity as a result of the closing of the circuit through microswitch 41.

The operation of the magazine interlock mechanism will now be described with reference to Figs. 8 and 9. As magazine M is inserted into the magazine-receiving cavity, microswitch 41 is moved from its normal open position and closed to complete an electrical circuit between input lead 115 through microswitch 41, through the normally closed microswitch 111 through solenoid 45 and back to input lead 117. As was stated above, this causes the contact roller 55 to move away from drive roller 57 permitting the leading end of film strip F to pass freely therebetween, detent lever 59 is moved over to align detent 71 with the entrance slot 73 provided in magazine M, locking bar 83 is pivoted to a horizontal position with respect to top wall 11 of the magazine-receiving cavity, and microswitch 81 is moved from its normal open position indicated in Fig. 8 to close the electrical circuit from input lead 115 through the now closed microswitch 41, through the closed microswitch 81, and through the film tab relay 119 to the input lead 117. When the film tab relay 119 is energized, the contacts 127, 131 and 123 are closed. As the magazine M is further inserted into the magazine-receiving cavity and positioned over detents 27 and 29, microswitch 111 is closed to contact 179 and moves from the position indicated in Fig. 8, thereby opening the circuit between solenoid 45 through microswitch 41. Solenoid 45 remains energized however, through the now closed film tab relay contacts 127 and 131, through switch 159, through microswitch 111 which is now closed across contact 179, and through now closed microswitch 41 to input lead 115. The film tab relay 119 remains energized through the now closed microswitches 81 and 41.

At this point in the operation of the mangazine interlock system, the magazine M is fully inserted into the magazine-receiving cavity and has been lowered over the detents 27 and 29 as stated above. The operator is now ready to energize the film drive motor 171 and thereby begin paying-out film strip F from the magazine. The film drive motor 171 is controlled by the manual switch 157 and is energized by moving the switch handle about pivot 191 to advance, as indicated by the arrow in Fig. 9. This movement closes contacts 141, 147 and 149 and energizes coil 173 of motor 171 which drives film drive roller 57 to draw film strip F from the magazine M. The movement of the handle of switch 157 to the advance position opens the circuit to solenoid 45 through switch 159 deenergizing solenoid 45. When solenoid 45 is deenergized, contact roller 55 is pivoted towards the film drive roller 57 engaging the film strip F therebetween, detent lever 59 is returned by spring 75 to move detent 71 over in slot 73 of magazine M and lock the magazine in the magazine-receiving cavity, locking bar 83 pivots to its vertical or locking position illustrated in Figs. 2 and 3 thereby preventing the magazine M from being lifted off of detents 27 and 29, and microswitch 81 is permitted to return to its normal open position after the plastic stop S is advanced from under shoe 80 to thereby deenergize film tab relay 119 and close film tab relay contacts 121, 125 and 129. So long as the handle of manual switch 157 is in the advance position, film drive motor 171 continues to drive roller 57 and withdraw film strip F from magazine M. The payed-out film strip is guided by suitable means (not shown) through the film gate (not shown) of the film reader (not shown) for viewing as desired. All the time that the film drive motor 171 is operating with the handle of switch 157 in the advance position, tendency drive motor 169 is energized from input lead 115 through closed microswitch 41, through microswitch 111 now closed to contact 179, through closed film tab relay contacts 121, and through the full resistance of variable resistor 167. The torque from the tendency drive motor 169 is applied to the core (not shown) in magazine M through a suitable opening (not shown) provided in the bottom wall 18 of the magazine cavity and aligned with the opening (not shown) in the bottom face of magazine M. The torque applied to the core by motor 169 tends to resist the withdrawal of the film strip F from the magazine M but is not sufficiently great to prevent such withdrawal by the film drive motor 171 when the handle of switch 157 is in the advance position.

It should be noted that from the instant the manual switch 157 is moved to the advance position it is impossible to remove magazine M from the magazine-receiving cavity because locking bar 83 prevents the raising of the magazine M off of detents 27 and 29, and further because detent 71 is not aligned with the entrant portion of slot 73 in the magazine.

When the manual switch 157 is pivoted back to its neutral position shown in Fig. 9, contacts 141, 147, and 149 are opened, thus deenergizing motor 171, and switch 159 is returned to its normal closed position shown in Fig. 8. The torque transmitted to the core within the magazine M by tendency drive motor 169 while energized through the full resistance of variable resistor 167, is insufficient to overcome the frictional resistance to movement of the payed-out film strip F and return the film strip into the magazine. Thus the image on that portion of the film strip F then in the film gate (not shown) of the reader (not shown) can be viewed at the operator's pleasure. Since the circuit to solenoid 45 through microswitch 111 is still open and since contacts 127 and 131 are open, it is impossible to remove magazine M from the magazine-receiving cavity while some film strip F remains payed-out from the magazine M, even though the handle of manual switch 157 is in the neutral position.

When the handle of manual switch 157 is pivoted to the reverse position, contacts 151, 145 and 143 are closed and since contacts 129 and 125 are in their normal closed positions, power is applied to the reverse field coil 175 and film drive motor 171 rotates film drive roller 57 in a direction to cause the film drive roller 57 to return the film strip F into the magazine M. Movement of the manual switch 157 to the reverse position indicated in Fig. 9 also moves microswitch 161 to contact 165 and power is applied to tendency drive motor 169 through a small portion of the resistance of variable resistor 167 whereby motor 169 exerts an increased torque on the core within the magazine M. The increased torque is sufficient to rotate the core and wind film strip F, returned to the magazine by the film drive motor 57, onto the core. Again it should be noted that it is impossible for the operator to remove the magazine M from the magazine-receiving cavity while the manual switch 157 is in the reverse position and while film strip F remains payed-out from the magazine M because the electrical circuit to the solenoid 45 through microswitch 111 is open and contacts 127 and 131 are still open. Thus locking bar 83 remains in its vertical or locking position and detent 71 is not aligned with the entrant portion of slot 73 in the magazine M. When, however, the film strip F has been fully returned into the magazine M and wound up on the core of the magazine to the point where plastic stop S on the leading end of the film strip is in abutment with the opening in the magazine through which the film strip F passes, the plastic stop S engages shoe 80 of microswitch 81 and raises switch lever 79 a distance sufficient to actuate microswitch 81 thereby closing the circuit to the film tab relay 119. When the film tab relay 119 is energized the electrical circuit to the solenoid 45 is completed through the film tab relay contacts 127 and 131, through microswitch 159 which is then in its normal closed position, through microswtich 111 which is still closed with contact 179 and through closed microswitch 41 to the input lead 115. When solenoid 45 is energized contact roller 55 is pivoted away from drive roller 57, detent lever 59 is moved over against the bias of spring 75 to align detent 71 with the entrant portion of slot 73 in magazine M, locking bar 83 is pivoted to its substantially horizontal position with respect to top wall 11 of the magazine cavity and microswitch 81 is locked by arm 77 in its closed position maintaining the circuit to the film tab relay 119 closed. At this it is now possible to withdraw the magazine M from the magazine-receiving cavity by first lifting the magazine M up off of detents 27 and 29 and then pulling magazine M out from the cavity. When magazine M has been lifted up off of detents 27 and 29 microswitch 111 is returned to its normal closed position, indicated in Fig. 8. After the magazine is withdrawn part way from the magazine-receiving cavity, microswitch 81 is returned to its normal open position and the film tab relay 119 is deenergized thereby opening the circuit to the solenoid 45 through the now opened contacts 127 and 131. However, solenoid 45 remains energized through the normally closed microswitch 111 and the microswitch 41 which is still in its closed position. Complete withdrawal of the magazine permits microswitch 41 to return to its normal open position and at this time lamp 177 is extinguished, solenoid 45 is deenergized causing locking bar 83 to move to its locking position substantially vertical to top wall 11, microswitch 81 returns to its normal open position as arm 77 releases lever 79, contact roller 55 moves into engagement with film drive roller 57, and detent lever 59 moves detent 71 back to non-alignment with the entrant slot 73 in the magazine M. All of the switches are now in their normal positions indicated in Fig. 8, and the magazine interlock mechanism has been returned to its neutral state ready for receiving another magazine, and the cycle can be repeated.

Quite obviously from Fig. 8, should a magazine be inserted improperly into the magazine-receiving cavity, that is either upside down, wrong side first or backwards, microswitches 41, 111 and/or microswitch 81 cannot be actuated and the circuits controlled thereby will remain open with the result that no power can be supplied to film drive motor 171 even though the manual switch 157 is operated.

It will now be appreciated by those skilled in the art that the magazine interlock mechanism of the present invention operates to prevent withdrawal of film strip from the magazine in the event that the magazine has not been properly positioned within the cavity and further prevents the withdrawal of the magazine from the magazine-receiving cavity in the event that any amount of film strip has been payed-out from the magazine and not returned thereto. While only one specific embodiment of the present invention has been described, many modifications and variations are possible and will be readily apparent to those skilled in the art from the foregoing description which is intended therefore to be illustrative only and the scope of the invention is defined in the appended claims.

Having now particularly described our invention, what we desire to secure by Letters Patent of the United States and what we claim is:

1. The combination with a magazine having in one end thereof a slot formed with an entrant portion and a locking portion, said magazine containing a strip of material having a switch control means carried on the leading end thereof, an apparatus having a cavity for receiving said magazine, and means including a source of electric power for withdrawing said strip from said magazine when said magazine is positioned in said cavity, of a magazine interlock mechanism comprising a locking detent extending into said cavity and mounted for movement from a first position aligned with said entrant portion and permitting the insertion of said magazine into said cavity to a second position engaged in said locking portion and preventing the withdrawal of said magazine from said cavity, actuating means for controlling the movement of said detent to said positions, an electric circuit connecting said source of power and said actuating means, and switch means actuated in response to said control means upon withdrawal of a predetermined length of said strip from said magazine to open said circuit to said actuating means and move said locking detent from said first to said second position.

2. The combination with a magazine having in one end thereof a slot formed with an entrant portion and a locking portion, said magazine containing a strip of material having a switch controls means carried on the leading end thereof, an apparatus having a cavity defined by at least two opposed walls for receiving said magazine, and means including a source of electric power for withdrawing said strip from said magazine when said magazine is positioned in said cavity, of a magazine interlock mechanism comprising a locking detent extending into said cavity and mounted for movement from a first position aligned with said entrant portion to a second position engaged in said locking portion, locking means pivotally mounted in said cavity for movement from a first position adjacent one of said walls to a second position in closer proximity to the other of said walls, actuating means for simultaneously moving said locking detent and said locking means to said second position of each respectively, an electric circuit connecting said source of power and said actuating means, and switch means actuated in response to said control means upon withdrawal of a predetermined length of said strip from said magazine to open said circuit to said actuating means and move said locking detent and said locking means to said second position of each respectively, and thereby preventing the withdrawal of said magazine from said cavity.

3. The combination with a magazine having in one end thereof a slot formed with an entrant portion and a locking portion, said magazine containing a strip of material having a switch control means carried on the leading end thereof, an apparatus having a cavity defined by at least two opposed walls for receiving said magazine, and means including a source of electric power for withdrawing said strip from said magazine when said magazine is positioned in said cavity, of a magazine interlock mechanism comprising a locking detent extending into said cavity and mounted for movement from a first position aligned with said entrant portion to a second position engaged in said locking portion, two upstanding detents formed in one of said walls for engaging said magazine when positioned in said cavity, locking means pivotally mounted in said cavity for movement from a first position adjacent the other of said walls to a second position in closer proximity to said one wall, said locking means being mounted over said upstanding detents and in approximate alignment therewith and in said second position thereof restraining the movement of said magazine off of said detents, actuating means for simultaneously moving said locking detent and said locking means to said second position of each respectively, an electric circuit connecting said source of power and said actuating means, and switch means actuated in response to said control means upon withdrawal of a predetermined length of said strip from said magazine to open said circuit to said actuating means and move said locking detent and said locking means to said second position of each respectively and thereby securely locking said magazine in said cavity.

4. The combination with a magazine containing a strip of material having a switch control means carried on one end thereof, an apparatus having a cavity defined by at least two opposed walls for receiving said magazine, and means including a source of electric power for withdrawing said strip from said magazine when said magazine is positioned in said cavity, of a magazine interlock mechanism comprising an upstanding detent formed in one of said walls for engaging said magazine when positioned in said cavity, locking means mounted in said cavity for movement from a first position adjacent the other of said walls to a second position in closer proximity to said one wall, said locking means being mounted over said detent and in said second position restraining the movement of said magazine off of said detent, actuating means for controlling the movement of said locking means to said positions, an electric circuit for interconnecting said source of power and said actuating means, and means actuated by said switch control means upon withdrawal of a predetermined length of said strip from said magazine to open said circuit to said actuting means to move said locking means from said first to said second position and whereby said magazine is fully locked in said cavity.

5. The combination with a magazine continuing a strip of material having a switch control means carried on the leading end thereof, an apparatus having a cavity defined by at least a top wall, a bottom wall and two side walls for receiving said magazine, means including a source of electric power for withdrawing said strip from said magazine when said magazine is positioned in said cavity, of a magazine interlock mechanism comprising a pair of upstanding detents formed in said bottom wall for engaging said magazine when positioned in said cavity, locking means pivotally mounted to said side walls and within said cavity for movement for a first position adjacent said top wall to a second position in closer proximity to said bottom wall, said locking means being mounted over said detents and in approximate alignment therewith and in said second position restraining the movement of said magazine off of said detents, actuating means for controlling the movement of said locking means to said positions, an electric circuit for interconnecting said source of power and said actuating means, and dual switch means for opening said electric circuit to said actuating means to move said locking means to said second position, one said switch means being actuated in response to the positioning of said magazine in said cavity and in engagement with said detents, and the other said switch means being actuated by said switch control means upon the withdrawal of a predetermined length of said strip from said magazine.

6. The combination with a magazine containing a strip of material having a switch control means carried on the leading end thereof, an apparatus having a cavity defined by at least a top wall, a bottom wall and two side walls for receiving said magazine, means including a source of electric power for withdrawing said strip from said magazine when said magazine is positioned in said cavity, of a magazine interlock mechanism comprising two upstanding detents formed in said bottom wall for engaging said magazine when positioned in said cavity, a locking bar pivotally mounted to said side walls and within said cavity for movement from a first position adjacent said top wall to a second position in closer proximity to said bottom wall, said locking bar being mounted over said detents and in approximate alignment therewith and in said second position restraining the movement of said magazine off of said detents, a solenoid operatively connected to said locking bar for controlling the movement of said locking bar to said positions and having an actuating coil, an electric circuit for interconnecting said source of power and said coil to said solenoid, means responsive to the partial insertion of said magazine into said cavity for closing said electric circuit to said coil and moving said locking bar into said first position to permit the further insertion of said magazine into said cavity, and means actuated by said control means upon the withdrawal of a predetermined length of said strip from said magazine for opening said circuit to deenergize said coil and move said locking bar to said second position whereby said magazine is fully locked in said cavity.

7. The combination with a magazine having in one end thereof a slot formed with an entrant portion and a locking portion, said magazine containing a strip of material having switch control means carried on the leading end thereof, an apparatus having a cavity for receiving said magazine, and means including a source of electric power for withdrawing said strip from said magazine when said magazine is positioned in said cavity, of a magazine interlock mechanism comprising a locking detent extending into said cavity and mounted for movement between a first position aligned with said entrant portion to allow said magazine to be inserted into said cavity and a second position engaged in said locking portion to prevent the withdrawal of said magazine from said cavity, actuating means for controlling the movement of said detent to said positions, an electric circuit connecting said source of power and said actuating means, and switch means responsive to said control means upon both the withdrawal of a predetermined length of said strip from said magazine and the return of said strip into said magazine for controlling the energizing of said actuating means and thereby the movement of said locking detent from one to the other of said first and second positions.

8. The combination with a magazine containing a strip of material having switch control means carried on one end thereof, an apparatus having a cavity defined by at least two opposed walls for receiving said magazine, and means including a source of power for withdrawing said strip from said magazine when said magazine is positioned in said cavity, of a magazine interlock mechanism comprising an upstanding detent arranged on one of said walls for engaging said magazine when positioned in said cavity, locking means mounted in said cavity for movement from a first position adjacent to the other of said walls to a second position in closer proximity to said one wall, said locking means being mounted over said detent and in said second position restraining the movement of said magazine off of said detent, actuating means for controlling the movement of said locking means to said positions, an electric circuit connecting said source of power and said actuating means, and means responsive to said control means upon both the withdrawal of a predetermined length of said strip from said magazine and the return of said strip into said magazine for controlling the energizing of said actuating means and thereby the movement of said locking means from one to the other of said first and second positions.

No references cited.